US009664122B2

(12) United States Patent
Coldren et al.

(10) Patent No.: US 9,664,122 B2
(45) Date of Patent: May 30, 2017

(54) IN-CYLINDER DYNAMIC GAS BLENDING FUEL INJECTOR AND DUAL FUEL ENGINE

(71) Applicant: Caterpillar, Inc., Peoria, IL (US)

(72) Inventors: Dana R. Coldren, Secor, IL (US); Cory A. Brown, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 112 days.

(21) Appl. No.: 14/807,947

(22) Filed: Jul. 24, 2015

(65) Prior Publication Data
US 2015/0330316 A1 Nov. 19, 2015

Related U.S. Application Data

(62) Division of application No. 13/741,851, filed on Jan. 15, 2013, now Pat. No. 9,157,384.

(51) Int. Cl.
F02M 21/02 (2006.01)
F02D 19/06 (2006.01)
F02D 19/08 (2006.01)
F02M 43/04 (2006.01)
F02M 47/02 (2006.01)
F02M 45/08 (2006.01)
F02D 19/10 (2006.01)

(52) U.S. Cl.
CPC ..... F02D 19/0642 (2013.01); F02D 19/0694 (2013.01); F02D 19/08 (2013.01); F02D 19/10 (2013.01); F02M 43/04 (2013.01); F02M 45/086 (2013.01); F02M 47/027 (2013.01); Y02T 10/36 (2013.01)

(58) Field of Classification Search
CPC .. F02D 19/0642; F02D 19/0694; F02D 19/10; F02D 19/08; F02M 45/086; F02M 43/04; F02M 47/027; Y02T 10/36
USPC ............... 239/533.8, 5, 88–92, 96, 417.5, 239/585.1–585.5, 533.2
See application file for complete search history.

(56) References Cited

U.S. PATENT DOCUMENTS

| | | | |
|---|---|---|---|
| 4,856,713 A | 8/1989 | Burnett | |
| 7,556,017 B2 * | 7/2009 | Gibson | F02M 47/027 123/299 |
| 8,925,519 B2 * | 1/2015 | Kim | F02M 63/029 123/299 |
| 9,228,505 B2 * | 1/2016 | Mittal | F02D 19/06 |
| 2005/0274828 A1 | 12/2005 | Kurz et al. | |
| 2006/0284129 A1 | 12/2006 | Krishnaswamy et al. | |
| 2011/0108631 A1 | 5/2011 | Mumford et al. | |
| 2012/0187218 A1 | 7/2012 | Kim et al. | |

(Continued)

FOREIGN PATENT DOCUMENTS

| | | |
|---|---|---|
| CN | 1425107 | 6/2003 |
| KR | 20120015062 | 8/2010 |

(Continued)

*Primary Examiner* — Hung Q Nguyen

(57) ABSTRACT

A dual fuel engine utilizes a compression ignited pilot injection of liquid diesel fuel to ignite a mixture of gaseous fuel and air in each engine cylinder. The gaseous fuel is injected at a relatively low pressure directly into the engine cylinder from a fuel injector. The liquid diesel fuel is injected directly into the engine cylinder from the same fuel injector. In-cylinder dynamic gas blending during the compression stroke can reduce potential hydrocarbon slip that could occur when unburned fuel resides in crevice volumes within the engine cylinder.

16 Claims, 5 Drawing Sheets

(56) References Cited

U.S. PATENT DOCUMENTS

2012/0255523 A1 10/2012 Kim et al.
2013/0200174 A1 8/2013 Jeon et al.
2014/0091159 A1 4/2014 Brown et al.

FOREIGN PATENT DOCUMENTS

WO 2012002620 1/2012
WO 2012072881 6/2012

* cited by examiner

IN-CYLINDER DYNAMIC GAS BLENDING FUEL INJECTOR AND DUAL FUEL ENGINE

RELATED APPLICATION

The present application claims the benefit of U.S. application Ser. No. 13/741,851 filed Jan. 1, 2013, which is incorporated herein in its entirety by reference.

TECHNICAL FIELD

The present disclosure relates generally to dual fuel engines, and more particularly to a fuel injector that facilitates in-cylinder dynamic gas blending.

BACKGROUND

Typical dual fuel engines operate at relatively low gas pressures (e.g., 100-200 PSI), making in-cylinder injection difficult with traditional nozzle designs. In these engines, the gaseous fuel is mixed with air via fumigation or port injection to provide a homogeneous mixture for a small liquid diesel pilot injection to ignite. In other words, a compression ignited small diesel injection is used to ignite a homogeneous mixture of gaseous fuel and air in the individual cylinders. This approach can create a challenge to control hydrocarbon slip into the exhaust due to fractional amounts of gaseous fuel that are present in the crevice volumes of the combustion chamber. Co-owned U.S. Patent Application Publication No. U.S. 2012/0187218 shows a dual fuel engine alternative in which relatively high pressure gaseous fuel is injected directly into the engine cylinder.

The present disclosure is directed toward one or more of the problems set forth above.

SUMMARY

In one aspect, a dual fuel engine includes an engine housing that defines a plurality of cylinders. A plurality of fuel injectors each has an injector body that defines a liquid nozzle outlet set and a gaseous nozzle outlet set that open into one of the cylinders. Each of the injector bodies also defines a liquid fuel inlet, a gaseous fuel inlet and a drain outlet. Each of the fuel injectors includes a liquid needle valve member that opens and closes the liquid nozzle outlet set, and a gaseous needle valve member that opens and closes the gaseous nozzle outlet set. Each fuel injector also includes a first electrical actuator operably coupled to the liquid needle valve member, and a second electrical actuator operably coupled to the gaseous needle valve member. A high pressure liquid fuel common rail is fluidly connected to the liquid fuel inlet of each of the fuel injectors. A low pressure gaseous fuel common rail is fluidly connected to the gaseous fuel inlet of each of the fuel injectors. A drain line is fluidly connected to the drain outlet. Each of the fuel injectors includes a drain annulus that surrounds the gaseous needle valve member and is fluidly connected to the drain outlet.

In another aspect, a fuel injector includes an injector body that defines a liquid fuel inlet, a gaseous fuel inlet, a liquid nozzle outlet set, a gaseous nozzle outlet set and a drain outlet. A first electrical actuator, a second electrical actuator, a liquid nozzle chamber, a gaseous nozzle chamber, a first needle control chamber and a second needle control chamber are disposed in the injector body. The liquid nozzle chamber, the first needle control chamber and the second needle control chamber are fluidly connected to the liquid fuel inlet. The gaseous nozzle chamber is fluidly connected to the gaseous fuel inlet. A first control valve member is operably coupled to the first electrical actuator and is movable between a first position that blocks the first needle control chamber to the drain outlet, and a second position that fluidly connects the first needle control chamber to the drain outlet. A second control valve member is operably coupled to the second electrical actuator and is movable between a first position that blocks the second needle control chamber to the drain outlet, and a second position that fluidly connects the second needle control chamber to the drain outlet. A liquid needle valve member has an opening hydraulic surface exposed to fluid pressure in the liquid nozzle chamber, and a closing hydraulic surface exposed to fluid pressure in the first needle control chamber. The liquid needle valve member is movable between a closed position blocking the liquid nozzle chamber to the liquid nozzle outlet set, and an open position fluidly connecting the liquid nozzle chamber to the liquid nozzle outlet set. A gaseous needle valve member has an opening hydraulic surface exposed to fluid pressure in the liquid nozzle chamber, and a closing hydraulic surface exposed to fluid pressure in the second needle control chamber. The gaseous needle valve member is movable between a closed position blocking the gaseous nozzle chamber to the gaseous nozzle outlet set, and an open position fluidly connecting the gaseous nozzle chamber to the gaseous nozzle outlet set. A drain annulus surrounds the gaseous needle valve member and is fluidly connected to the drain outlet.

In still another aspect, a method of operating an engine includes supplying high pressure liquid fuel to a liquid fuel inlet of a fuel injector. Low pressure gaseous fuel is supplied to a gaseous fuel inlet of the fuel injector. Gaseous fuel is injected directly into an engine cylinder from a gaseous nozzle outlet set of the fuel injector. Liquid fuel is injected directly into the engine cylinder from a liquid nozzle outlet set of the fuel injector. Leakage of liquid fuel into a gaseous nozzle chamber of the fuel injector is reduced by moving liquid fuel from a drain annulus that surrounds a gaseous needle valve member toward a drain outlet. The injected liquid fuel is compression ignited in the engine cylinder. A mixture of air and the injected gaseous fuel is ignited in the engine cylinder with the compression ignited liquid fuel.

DETAILED DESCRIPTION

Figure 1:
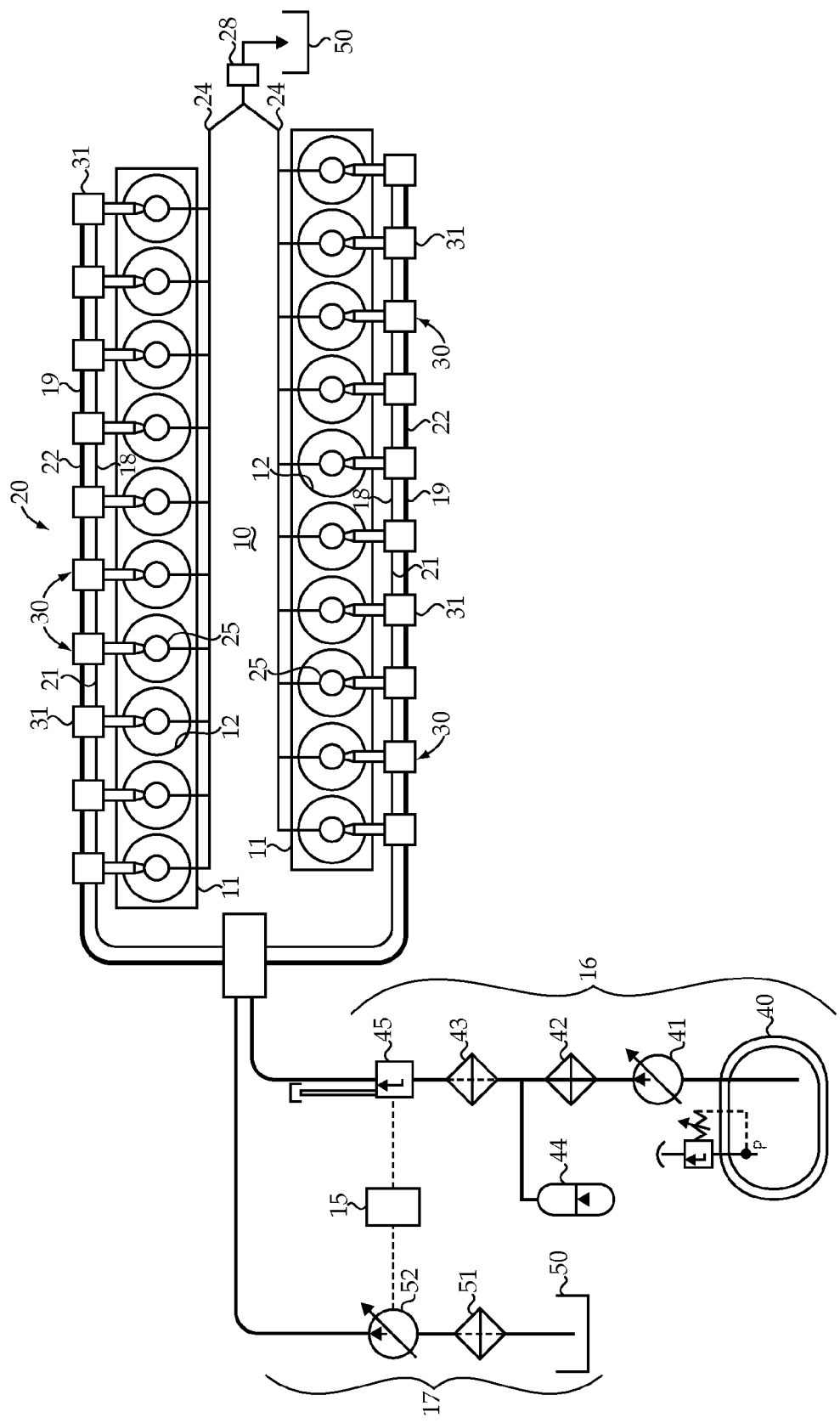
FIG. 1 is a schematic view of a dual fuel engine according to the present disclosure.
Figure 2:
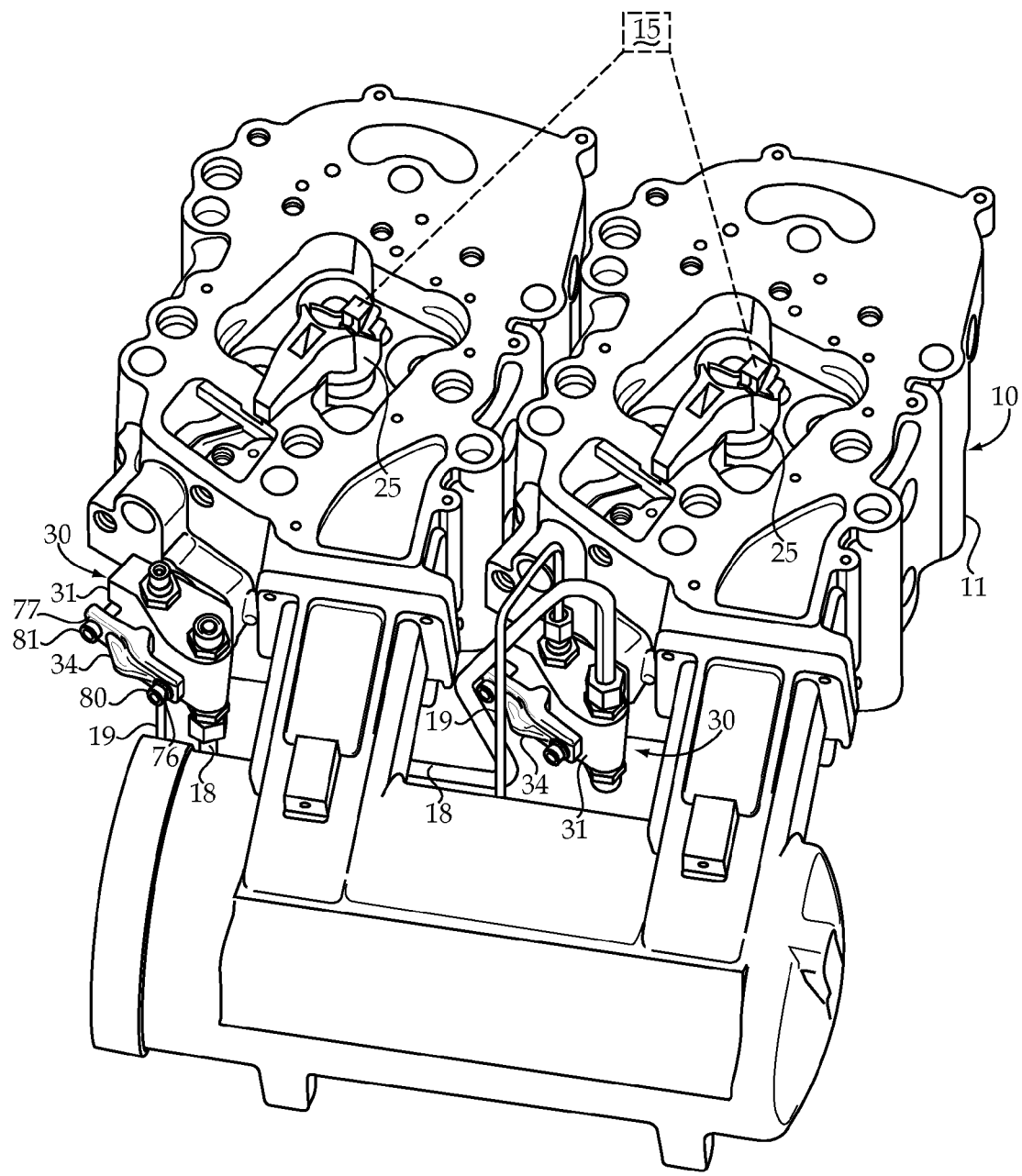
FIG. 2 is a perspective view of a portion of the engine and dual fuel common rail system for the engine of FIG. 1.
Figure 3:
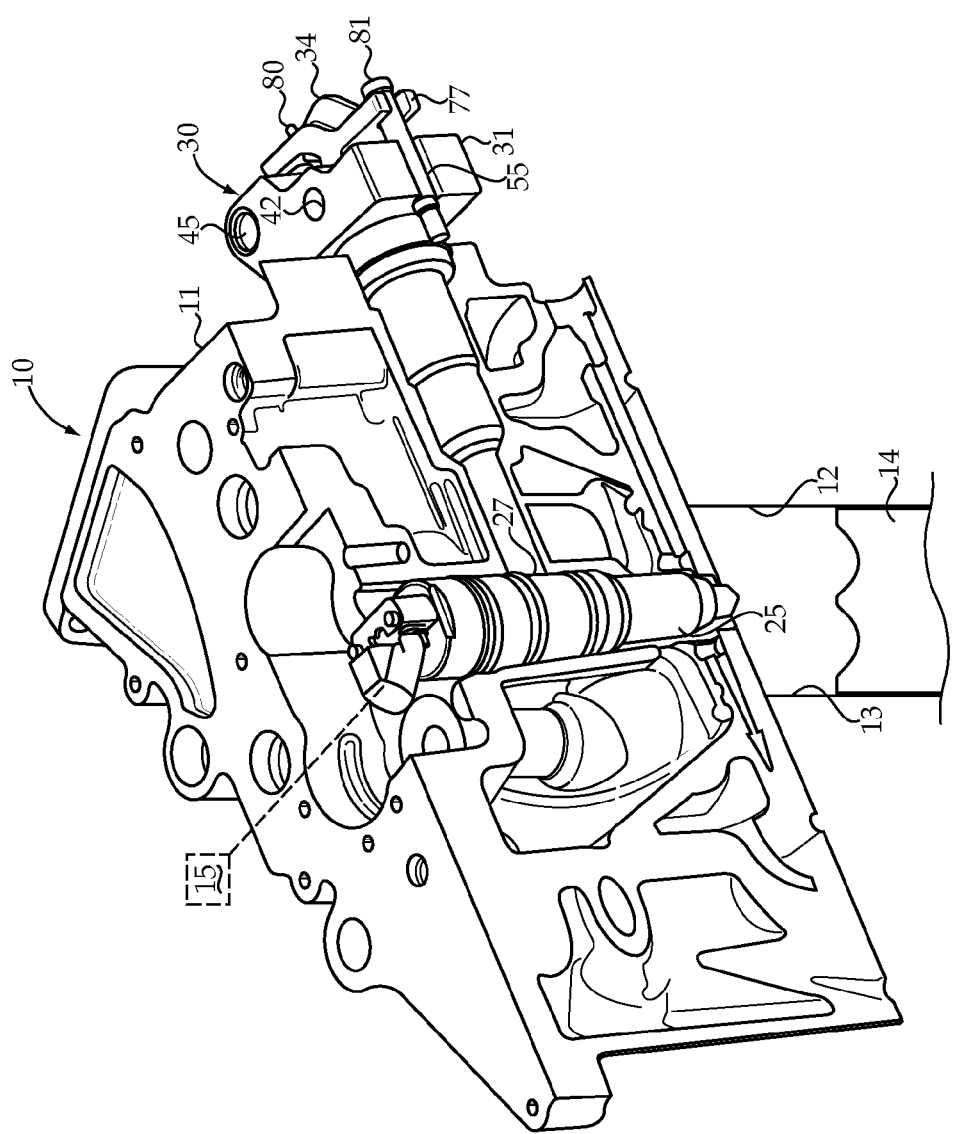
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. A piston 14 is positioned to reciprocate in each engine cylinder between a bottom dead center position and a top dead center position to define a compression ratio greater than 14:1, which corresponds to a compression ratio that allows liquid diesel fuel to compression ignite in a manner well known in the art. The dual fuel common rail system 20 includes exactly one fuel injector 25 positioned for direct injection into each of the plurality of engine cylinders 12. A low pressure gaseous fuel common rail 21 and a high pressure liquid fuel common rail 22 are fluidly connected to each fuel injector 25. Each of the fuel injectors 25 also includes a drain outlet 105 (FIG. 5) fluidly connected to a drain line 24 that empties into liquid diesel fuel tank 50. A pressure regulator 28 of a suitable design may be located in drain line 24 in order to maintain pressure in the drain line 24 above the pressure in the gaseous fuel common rail 21. Pressure regulator 28 may be a simple orifice or an actual valve of a type known in the art. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are in control communication with, and controlled by, an electronic engine controller 15 in a known manner. The gas supply and pressure control devices 16 may include a pressurized cryogenic liquefied natural gas tank 40 with an outlet fluidly connected to a variable delivery cryogenic pump 41. Devices 16 may also include a heat exchanger 42, an accumulator 44, a gas filter 43 and a fuel conditioning module 45 that controls the supply and pressure of gaseous fuel to gaseous fuel common rail 21. The liquid supply and pressure control devices 17 may include a liquid diesel fuel tank 50, fuel filters 51 and an electronically controlled high pressure pump 52 that supplies liquid fuel to, and controls pressure in, liquid fuel common rail 22.

Figure 4:
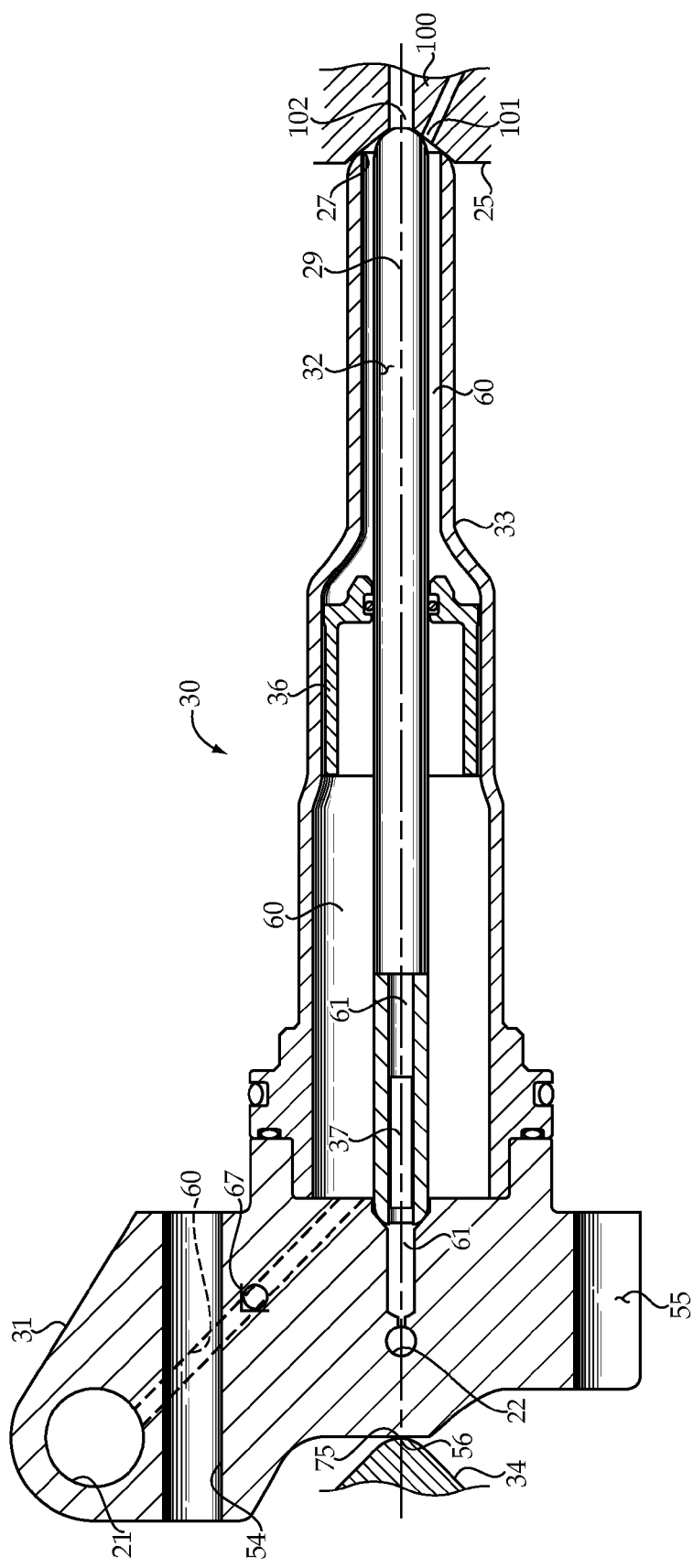
FIG. 4 is a sectioned side view through a co-axial quill assembly according to another aspect of the present disclosure.

Referring in addition to FIG. 4, the dual fuel common rail system 20 may include a co-axial quill assembly 30 with an inner quill 32 and an outer quill 33 in sealing contact with a common conical seat 27 of each fuel injector 25. The blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2. A coaxial quill assembly 30 is fluidly positioned between each of the plurality of fuel injectors 25 and each of the gaseous fuel common rail 21 and liquid fuel common rail 22.

Each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. The fasteners 80 and 81 are received in fastener bore 54 and fastener slot 55, respectively of blocks 31.

Each block 31 of each co-axial quill assembly 30 may define a segment of gaseous fuel common rail 21 that is oriented perpendicular to the axis 29 of inner quill 32. A gaseous fuel passage 60 opens at one end into gaseous fuel common rail 21 and opens at its other end into first fuel inlet 101 of fuel injector 25. A segment of gaseous fuel passage 60 is located between the inner quill 32 and the outer quill 33. Each of the blocks 31 also defines a segment of liquid fuel common rail 22. A liquid fuel passage 61 opens at one end into liquid fuel common rail 22, and opens at its opposite end into second fuel inlet 102 of fuel injector 25. Although not necessary gaseous fuel passage 60 may include a check valve 67 to prevent liquid fuel from migrating into gaseous fuel common rail 21.

In order to trap metallic debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the inner quill 32. The gaseous fuel edge filter 36 is shown positioned within outer quill 33. Those skilled in the art will appreciate that the edge filters 36 and 37 could be located elsewhere, or omitted, without departing from the scope of this disclosure.

Figure 5:
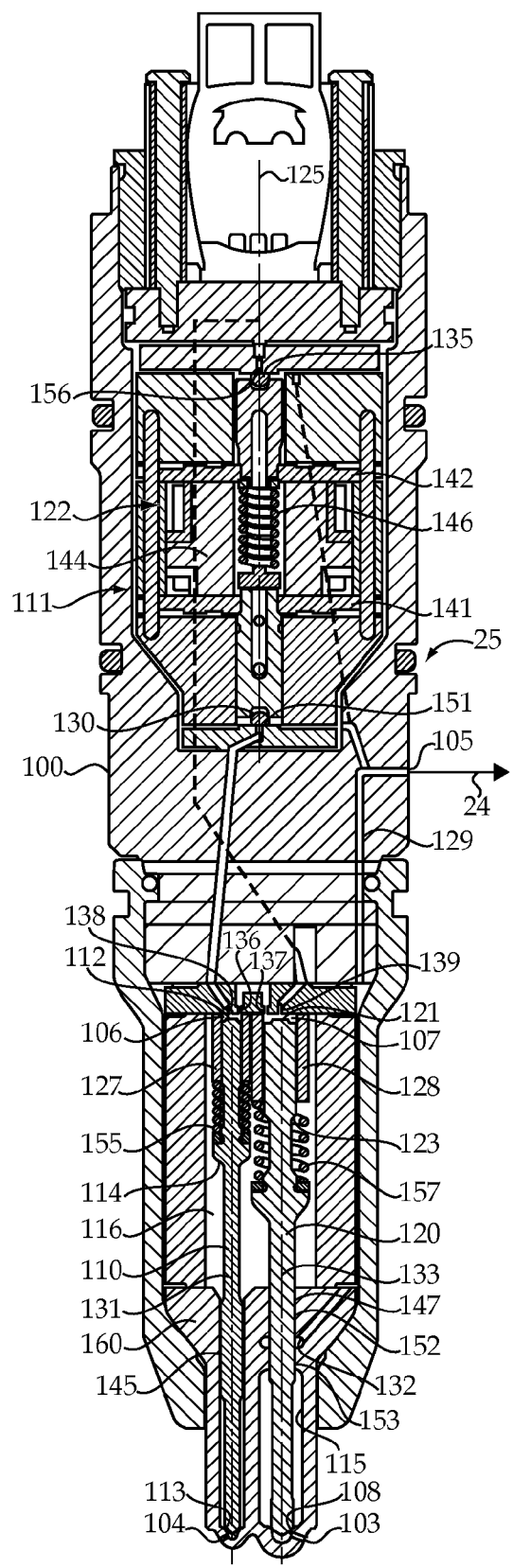
FIG. 5 is a sectioned front view of a fuel injector according to an aspect of the present disclosure.

Referring now in addition to FIG. 5, each fuel injector 25 includes an injector body 100 that defines a liquid fuel inlet 102 (FIG. 4), a gaseous fuel inlet 101 (FIG. 4), a liquid nozzle outlet set 104, a gaseous nozzle outlet set 103 and a drain outlet 105. A first electrical actuator 111, a second electrical actuator 122, a liquid nozzle chamber 116, a gaseous nozzle chamber 115, a first needle control chamber 106 and a second needle control chamber 107 are all disposed in the injector body 100. The liquid nozzle chamber 116, the first needle control chamber 106 and the second needle control chamber 107 are all fluidly connected to the liquid fuel inlet 102 via passageways not visible in the sectioned view of FIG. 5. The gaseous nozzle chamber 115 is fluidly connected to the gaseous fuel inlet 101, also via a passageway not visible in the sectioned view of FIG. 5. A first control valve member 130 is operably coupled to the first electrical actuator 111, and is movable between a first position that blocks the first needle control chamber 106 to the drain outlet 105, and a second position that fluidly connects the first needle control chamber 106 to the drain outlet 105. A second control valve member 135 is operably coupled to the second electrical actuator 122, and is movable between a first position that blocks the second needle control chamber 107 to the drain outlet 105, and a second position that fluidly connects the second needle control chamber 107 to the drain outlet 105. The first electrical actuator 111 includes a first armature 141, and the second electrical actuator 122 includes a second armature 142. The first and second electrical actuators 111, 122 may share a common stator 144. The first control valve member 130, the first armature 141, the second armature 142 and the second control valve member 135 may move along a common centerline 125. However, different geometries would also fall within the intended scope of the present disclosure.

A liquid needle valve member 110 has an opening hydraulic surface 114 exposed to fluid pressure and in the liquid nozzle chamber 116 (and high pressure liquid fuel common rail 22), and a closing hydraulic surface 112 exposed to fluid pressure in the first needle control chamber 106. Depending upon the pressure in first needle control chamber 106, liquid needle valve member 110 is movable between a closed position in contact with seat 113 blocking the liquid nozzle chamber 116 to the liquid nozzle outlet set 104, and an open position out of contact with seat 113 fluidly connecting the liquid nozzle chamber 116 to the liquid nozzle outlet set 104. A gaseous needle valve member 120 has an opening hydraulic surface 123 exposed to fluid pressure in the liquid nozzle chamber 116 (and high pressure liquid fuel common rail), and a closing hydraulic surface 121 exposed to fluid pressure in the second needle control chamber 107. Depending upon the pressure in second needle control chamber 107, the gaseous needle valve member 120 is movable between a closed position in contact with seat 108 blocking the gaseous nozzle chamber 115 to the gaseous nozzle outlet set 103, and an open position out of contact with seat 108 to fluidly connect the gaseous nozzle chamber 115 to the gaseous nozzle outlet set 103. Those skilled in the art will appreciate that the pressure in liquid nozzle chamber 116 is equal to the pressure in high pressure liquid fuel common rail 22, and that the pressure in gaseous nozzle chamber 115 is equal to the pressure in the low pressure gaseous fuel common rail 21. Because the liquid fuel common rail is at a pressure many times that of the gaseous fuel common rail, a drain annulus 132 surrounds the gaseous needle valve member 120 and is fluidly connected to the drain outlet 105 to capture any liquid fuel that migrates along the outside of gaseous needle valve member 120 toward gaseous nozzle chamber 115.

In the illustrated embodiment, the injector body 100 includes a tip component 160 that defines the liquid nozzle outlet set 104 and the gaseous nozzle outlet set 103. The liquid needle valve member 110 has a guide interaction 145 with the tip component 160, and the gaseous needle valve member 120 has a guide interaction 147 with the tip component 160. Flats (not shown) may be provided on the liquid needle valve member 110 to facilitate fuel flow past the guide interaction 145. The drain annulus 132 may separate an upper guide segment 152 from a lower guide segment 153 for the gaseous needle valve member 120. The drain annulus 132 is fluidly connected to the drain outlet via a drain passage 129. Those skilled in the art will appreciate that a guide interaction 145, 147 according to the present disclosure means that the moving component (e.g., needle valve member 110, 120) has a close diametrical clearance with the counterpart guide bore of the non-moving component (e.g., injector body 100). In the embodiment of FIG. 5, the liquid needle valve member 110 moves along a first centerline 131, and the gaseous needle valve member 120 moves along a second centerline 133 that is parallel to, but spaced apart from, first centerline 131. Those skilled in the art will appreciate that fuel injectors with dual concentric needle valve members could also fall within the intended scope of the present disclosure.

Although not necessary, the first needle control chamber 106 may be defined by the injector body 100, a first floating sleeve 127 and one end of the liquid needle valve member 110. The second needle control chamber 107 may be defined by the injector body 100, a second floating sleeve 128 and one end of gaseous needle valve member 120. Those skilled in the art will appreciate that the respective needle valve members 110, 120 have close diametrical clearances with their respective floating sleeves 127 and 128. A first spring 155 acts to simultaneously bias first needle valve member 110 toward its downward closed position and the first floating sleeve 127 upward into contact with injector body 100. Likewise, a second spring 157 simultaneously biases gaseous needle valve 120 downward toward its closed position and second floating sleeve 128 upward into contact with injector body 100.

Although not necessary, first control valve member 130 may move into and out of contact with a flat seat 151 to close and open the fluid connection between first needle control chamber 106 and drain outlet 105. Likewise, the second control valve member 135 may move into and out of contact with a second flat seat 156 to close and open, respectively, the fluid connection between the second needle control chamber 107 and the drain outlet 105. When the first and second electrical actuators 111 and 122 are de-energized, a shared spring 146 may serve to bias both the first control valve member 130 and the second control valve member 135 into contact with their respective flat seats 151 and 156. Those skilled in the art will appreciate that either or both of the seats 151 and 156 could be conical seats without departing from the intended scope of the present disclosure.

The first needle control chamber 106 may be always fluidly connected to the liquid fuel inlet 102 via a Z orifice 136 and a passageway not visible in the sectioned view of FIG. 5. Thus, when first electrical actuator 111 is de-energized and first control valve 130 is held in contact with flat seat 151, pressure in first needle control chamber 106 will be high. When first electrical actuator 111 is energized, high pressure can push first control valve 130 off of flat seat 151 to fluidly connect first needle control chamber 106 to drain outlet 105 through an A orifice 138. This results in a pressure drop acting on closing hydraulic surface 112 allowing the liquid needle valve member 110 to lift to its open position to commence a liquid fuel injection event. Thus, first electrical actuator 111 can be said to be operably coupled to the liquid needle valve member 110. Likewise, in the illustrated embodiment the second needle control chamber 107 is always fluidly connected to the liquid fuel inlet 102 via a Z orifice 137 and a fluid passageway not visible in the sectioned view of FIG. 5. When second electrical actuator 122 is de-energized, second control valve member 135 is held in contact with seat 156 to block the fluid connection between second needle control chamber 107 and drain outlet 105 resulting in high pressure acting on closing hydraulic surface 121. When second electrical actuator 122 is energized, high pressure in second needle control chamber 107 can act along the hidden passageway shown by a dashed line to push second control valve member 135 off of seat 156 to fluidly connect second needle control chamber to drain outlet 105 through A orifice 139, resulting in a pressure drop acting on closing hydraulic surface 121. When pressure drops, the high pressure liquid acting on opening hydraulic surface 123 can cause gaseous needle valve member 120 to lift to its open position to commence spray of gaseous fuel from gaseous nozzle outlet set 103. Thus, second electrical actuator 122 can be said to be operably coupled to gaseous needle valve member 120.

Both the liquid and gaseous fuel injection events are controlled by utilizing liquid fuel as a control fluid acting on both the respective opening hydraulic surfaces 114, 123 and the respective closing hydraulic surfaces 112, 121. Although the fuel injector 25 is illustrated as utilizing two way valves and flat seats, those skilled in the art will appreciate that three way valves might be substituted without departing from the scope of the present disclosure. In such a case, the respective control chambers 106 and 107 may not always be fluidly connected to the liquid fuel inlet, but instead be intermittently connected to the liquid fuel inlet depending upon a position of the three way valve. Still other control strategies might include additional orifices without departing from the present disclosure. In the embodiment of FIG. 5, both the liquid nozzle outlet set 104 and the gaseous nozzle outlet set 103 may include a plurality of nozzle outlets, such as six distributed around the respective centerlines 131 and 133 in a manner well known in the art. One could expect the combined flow area of the plurality of nozzle outlets that make up the gaseous nozzle outlet set 103 to be greater than the total flow area of the combined plurality of nozzle outlets that make up the liquid nozzle outlet set 104.

Figure 6:
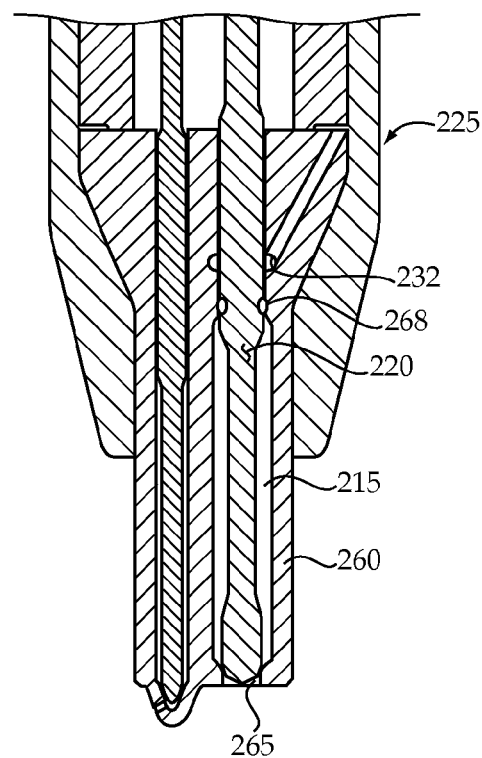
FIG. 6 is a sectioned front view of a tip portion of a fuel injector according to another aspect of the present disclosure.

Referring to FIG. 6, a fuel injector 225 according to an alternative embodiment of the present disclosure includes a tip component 260 that defines a gaseous nozzle outlet set that consists of only a single nozzle outlet 265. In this embodiment, the single nozzle outlet 265 may have a flow area that is greater than a total flow area of the plurality of nozzle outlets that make up the liquid nozzle outlet set in this alternative embodiment. This strategy may allow for a larger flow area so that a sufficient charge of gas can be delivered to the engine cylinder in the limited time available early in the compression stroke. In addition, this embodiment also is different in that it includes an optional O-ring seal 268 that surrounds the gaseous needle valve member 220 and is located between the gaseous nozzle chamber 215 and the drain annulus 232.

INDUSTRIAL APPLICABILITY

The present disclosure is generally applicable to dual fuel engines that utilize a small pilot injection quantity of liquid diesel fuel to ignite a much larger charge of gaseous fuel. In addition, the present disclosure finds specific applicability to dual fuel engines that utilize gaseous fuel supplied to the engine at a relatively low pressure, or at least many times lower than the liquid fuel pressure. Finally, the present disclosure finds general applicability to engines with a compression ratio in excess of 14:1 which corresponds to a compression ratio associated with compression ignition engines, such as those that utilize liquid diesel fuel. In addition, the present disclosure finds applicability to dual fuel engines where both the gaseous fuel and liquid fuel are supplied to the individual cylinders directly from an individual fuel injector associated with each engine cylinder.

Referring back to all of the Figs., a method of operating engine 10 includes supplying high pressure liquid fuel to the liquid fuel inlet 102 of each fuel injector 25. Likewise, low pressure gaseous fuel is supplied to the gaseous fuel inlet 103 of each fuel injector 25. In one specific embodiment, the liquid fuel pressure may be on the order of 40 MPa, whereas the gaseous fuel pressure may be on the order of 1-5 MPa. Although not necessary, the liquid fuel may be supplied from a liquid fuel common rail 22, and the gaseous fuel may be supplied from a gaseous fuel common rail 21. Thus one might expect the electronic controller 15 to maintain the liquid fuel pressure at the liquid fuel inlet 102 at least four times as high as the gaseous fuel pressure at gaseous fuel inlet 101. In other words, the pressure in the high pressure liquid fuel common rail 22 to a pressure in the low pressure gaseous fuel common rail 21 may be at least 4:1.

When in operation, gaseous fuel is injected directly into an engine cylinder 12 from a gaseous nozzle outlet set 103 of the fuel injector 25. In general, and because the gaseous fuel pressure is relatively low, the gaseous fuel may be injected during the compression stroke after the intake valve (not shown) for the individual cylinder 12 has closed. By providing a gaseous nozzle outlet set 103 with a relatively large flow area, the relatively large charge of gaseous fuel can be injected before cylinder pressures become too high. To some extent, how homogeneously the gaseous fuel charge mixes with air in the cylinder can be controlled with gaseous fuel injection timing limited by considerations in ensuring that an adequate amount of gaseous fuel is injected into the engine cylinder to provide the requested power from engine 10. Also during the operation, liquid fuel is injected directly into the engine cylinder 12 from the liquid nozzle outlet set 104 of each fuel injector. This fuel injection event will likely occur in the vicinity of top dead center when auto-ignition conditions are present in the individual cylinder 12 in a conventional manner. Thus, prior to injecting the liquid fuel, the already injected gaseous fuel can mix with air prior to ignition. The injected liquid fuel is compression ignited in the engine cylinder 12. A mixture of air and the injected gaseous fuel is ignited in the engine cylinder 12 with the compression ignited liquid fuel.

Leakage of liquid fuel into the gaseous nozzle chamber 115, 215 may be reduced by moving liquid fuel from a drain annulus 132, 232 that surrounds a gaseous needle valve member 120, 220 toward a drain outlet 105. In order to inhibit migration of gaseous fuel into the drain annulus 132, 232, the present disclosure teaches maintaining pressure in the drain annulus 132, 232 (and drain line 24) greater than pressure in the gaseous nozzle chamber 215, and hence the pressure in the gaseous fuel common rail 21. For instance, if the gaseous fuel pressure were 1 MPa, the drain outlet 105 may be maintained at a pressure of 1.1 MPa via appropriate setting of a pressure regulator 28, in a manner well known in the art. Thus, a ratio of the pressure in the drain line 24 to the pressure in the low pressure gaseous fuel common rail 21 is about 1. As used in this disclosure, the term "about" means the number rounded off to the same number of significant digits. Thus, 1.1 is about 1.

The present disclosure also teaches reducing hydrocarbon slip from the engine cylinder 12 by mixing air with the injected gaseous fuel away from the cylinder wall 13. This is to be contrasted with port injection dual fuel engines where gaseous fuel can find its way into crevices in the engine cylinder and go unburned resulting in hydrocarbon slip from engines according to the prior art. One way of reducing hydrocarbon slip in the present disclosure includes directing the gaseous fuel injection toward the center of the individual cylinders 12 to encourage mixing with air well away from the cylinder wall 13. The strategy of the present disclosure may be further leveraged by inducing a swirl into the air in the cylinder, and relying on the lower molecular weight of the gaseous fuel from that of air to assist in keeping the fuel away from cylinder walls. In most instances, the gaseous fuel injection will be performed during the compression stroke and completed prior to the liquid fuel injecting step. Because the gaseous fuel pressure is relatively low, the present disclosure teaches controlling movement of the gaseous needle valve member 120 with liquid fuel, and controlling movement of the liquid needle valve member 110 also with liquid fuel. Thus, the gaseous fuel serves only as an injected medium whereas the liquid fuel acts as both a control fluid and as a pilot injection medium during normal operation of engine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A dual fuel engine comprising:
an engine housing defining a plurality of cylinders;
a plurality of fuel injectors, each having an injector body that defines a liquid nozzle outlet set and a gaseous nozzle outlet set that open into one of the cylinders, and defines a liquid fuel inlet, a gaseous fuel inlet and a drain outlet, and including a liquid needle valve member that opens and closes the liquid nozzle outlet set, and a gaseous needle valve member that opens and closes the gaseous nozzle outlet set, and including a first electrical actuator operably coupled to the liquid needle valve member, and a second electrical actuator operably coupled to the gaseous needle valve member;

a high pressure liquid fuel common rail fluidly connected to the liquid fuel inlet of each of the fuel injectors;

a low pressure gaseous fuel common rail fluidly connected to the gaseous fuel inlet of each of the fuel injectors;

a drain line fluidly connected to the drain outlet; and each of the fuel injectors includes a drain annulus that surrounds the gaseous needle valve member, and is fluidly connected to the drain outlet.

2. The engine of claim 1 including a plurality of pistons that each reciprocate in one of the cylinders between a bottom dead center position and a top dead center position that define a compression ratio greater than 14:1.

3. The engine of claim 2 wherein a ratio of a pressure in the high pressure liquid fuel common rail to a pressure in the low pressure gaseous fuel common rail is at least 4:1.

4. The engine of claim 3 wherein the drain line is fluidly connected to a liquid tank;
a pressure regulator positioned in the drain line;
wherein a pressure in the drain line is greater than the pressure in the low pressure gaseous fuel common rail; and
a ratio of the pressure in the drain line to the pressure in the low pressure gaseous fuel common rail is about one.

5. The engine of claim 4 wherein the liquid needle valve member has an opening hydraulic surface exposed to fluid pressure in the high pressure liquid fuel common rail; and
the gaseous needle valve member has an opening hydraulic surface exposed to fluid pressure in the high pressure liquid fuel common rail.

6. The engine of claim 5 including a first needle control chamber and a second needle control chamber disposed in the injector body of each of the fuel injectors and fluidly connected to the liquid fuel inlet;
the liquid needle valve member has a closing hydraulic surface exposed to fluid pressure in the first needle control chamber; and
the gaseous needle valve member has a closing hydraulic surface exposed to fluid pressure in the second needle control chamber.

7. The engine of claim 6 wherein the liquid nozzle outlet set includes a plurality of nozzle outlets with a first total flow area;
the gaseous nozzle outlet set consists of a single nozzle outlet with a second flow area that is greater than the first total flow area.

8. The engine of claim 6 including an O-ring seal in contact with the gaseous needle valve member and the injector body at a location between the gaseous nozzle chamber and the drain annulus.

9. A dual fuel engine comprising:
an engine housing defining a plurality of cylinders;
a plurality of fuel injectors, each of the plurality of fuel injectors having
an injector body that defines a liquid fuel inlet, a gaseous fuel inlet, a liquid nozzle outlet set, a gaseous nozzle outlet set and a drain outlet,
a first electrical actuator, a second electrical actuator, a liquid nozzle chamber, a gaseous nozzle chamber, a first needle control chamber and a second needle control chamber disposed in the injector body,
the liquid nozzle chamber, the first needle control chamber and the second needle control chamber being fluidly connected to the liquid fuel inlet,
the gaseous nozzle chamber being fluidly connected to the gaseous fuel inlet,
a first control valve member operably coupled to the first electrical actuator and being movable between a first position that blocks the first needle control chamber to the drain outlet, and a second position that fluidly connects the first needle control chamber to the drain outlet,
a second control valve member operably coupled to the second electrical actuator and being movable between a first position that blocks the second needle control chamber to the drain outlet, and a second position that fluidly connects the second needle control chamber to the drain outlet,
a liquid needle valve member with an opening hydraulic surface exposed to fluid pressure in the liquid nozzle chamber, and a closing hydraulic surface exposed to fluid pressure in the first needle control chamber, and being movable between a closed position blocking the liquid nozzle chamber to the liquid nozzle outlet set, and an open position fluidly connecting the liquid nozzle chamber to the liquid nozzle outlet set,
a gaseous needle valve member with an opening hydraulic surface exposed to fluid pressure in the liquid nozzle chamber, and a closing hydraulic surface exposed to fluid pressure in the second needle control chamber, and being movable between a closed position blocking the gaseous nozzle chamber to the gaseous nozzle outlet set, and an open position fluidly connecting the gaseous nozzle chamber to the gaseous nozzle outlet set, and
a drain annulus surrounding the gaseous needle valve member and being fluidly connected to the drain outlet;
a high pressure liquid fuel common rail fluidly connected to the liquid fuel inlet of each of the fuel injectors;
a low pressure gaseous fuel common rail fluidly connected to the gaseous fuel inlet of each of the fuel injectors; and
a drain line fluidly connected to the drain outlet.

10. The engine of claim 9 including a plurality of pistons that each reciprocate in one of the cylinders between a bottom dead center position and a top dead center position that define a compression ratio greater than 14:1.

11. The engine of claim 10 wherein a ratio of a pressure in the high pressure liquid fuel common rail to a pressure in the low pressure gaseous fuel common rail is at least 4:1.

12. The engine of claim 11 wherein the drain line is fluidly connected to a liquid tank;
a pressure regulator positioned in the drain line;
wherein a pressure in the drain line is greater than the pressure in the low pressure gaseous fuel common rail; and
a ratio of the pressure in the drain line to the pressure in the low pressure gaseous fuel common rail is about one.

13. The engine of claim 12 wherein the liquid needle valve member has an opening hydraulic surface exposed to fluid pressure in the high pressure liquid fuel common rail; and
the gaseous needle valve member has an opening hydraulic surface exposed to fluid pressure in the high pressure liquid fuel common rail.

14. The engine of claim 13 including a first needle control chamber and a second needle control chamber disposed in the injector body of each of the fuel injectors and fluidly connected to the liquid fuel inlet;

the liquid needle valve member has a closing hydraulic surface exposed to fluid pressure in the first needle control chamber; and the gaseous needle valve member has a closing hydraulic surface exposed to fluid pressure in the second needle control chamber.

15. The engine of claim 14 wherein the liquid nozzle outlet set includes a plurality of nozzle outlets with a first total flow area;

the gaseous nozzle outlet set consists of a single nozzle outlet with a second flow area that is greater than the first total flow area.

16. The engine of claim 14 including an O-ring seal in contact with the gaseous needle valve member and the injector body at a location between the gaseous nozzle chamber and the drain annulus.

* * * * *